United States Patent Office 2,962,764
Patented Dec. 6, 1960

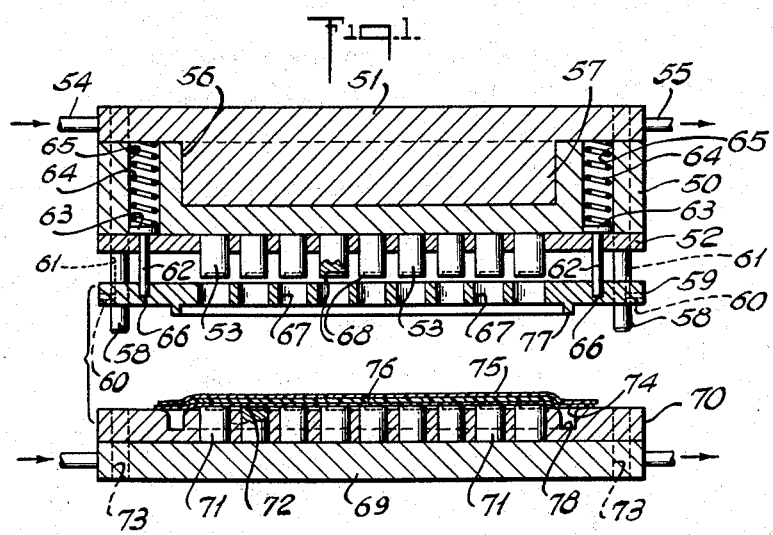
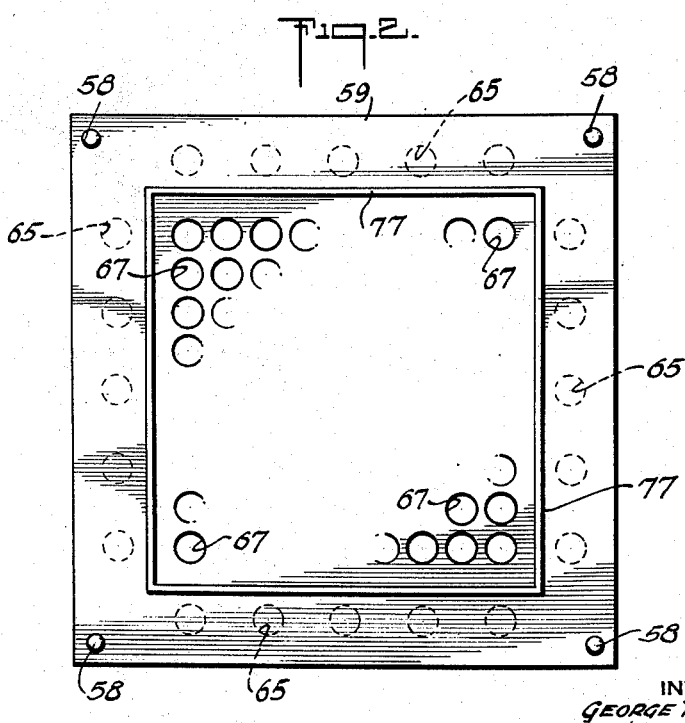

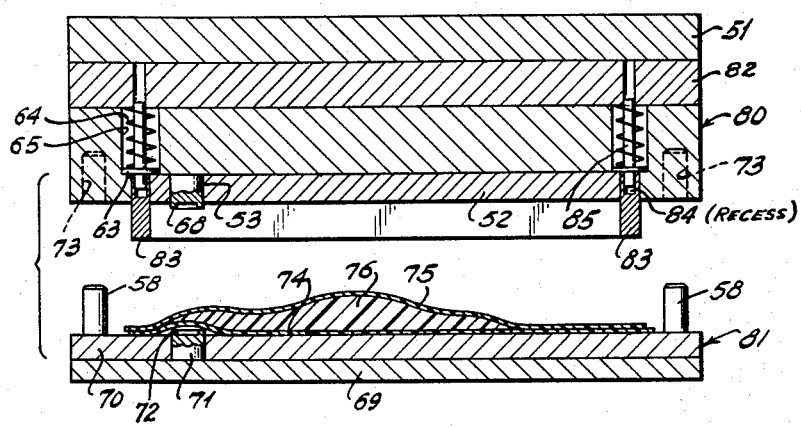
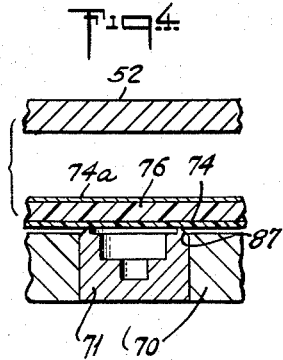
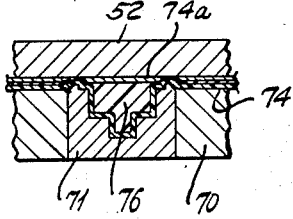
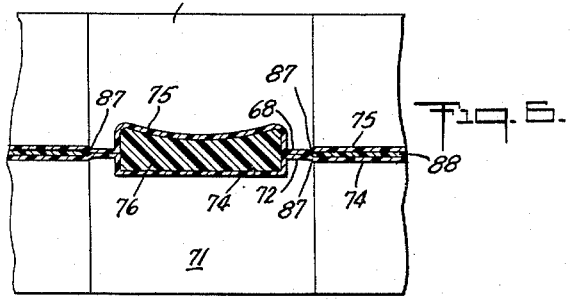

2,962,764

PROCESS FOR THE MANUFACTURE OF MOLDED ARTICLES

George Trojanowski, East Meadow, and Lawrence Brandt, Hicksville, N.Y., assignors to Oceana International, Inc., Brooklyn, N.Y.

Filed Mar. 1, 1956, Ser. No. 568,768

10 Claims. (Cl. 18—55)

The present invention relates to an improved molding process and apparatus for the manufacture of molded articles of various kinds from heat-hardenable substantially liquid resins, and particularly from addition type resins of thermosetting character.

In the molding of liquid addition type resins it is known to fill the individual cavities in the lower part of a mold with measured amounts of resin and then place a sheet of cellophane or cellulose ester over such filled cavities in order to aid the escape of trapped air as the mold is closed, a sufficient excess of resin being deposited in and around such cavities to provide for filling the registering complementary cavities in the upper part of the mold (when these are present) and for flash. This process has, however, not proved to be entirely satisfactory in actual practice for a number of reasons. In the first place, when the resin is mobile in character, air bubbles are apt to be trapped within the masses of resin as it is poured into the cavities, and it is impractical to wait until the bubbles have risen to the surface of the relatively viscous resin. With less mobile or semi-liquid resins, measurement of exact quantities is difficult and, in addition, the danger of trapping air between the mass of resin and the walls of the cavity is great, and increases with the complexity of the shape of the cavity. As a result, a large proportion of the molded articles is defective by reason of the entrapped air. Moreover, the ejection of the molded articles from the lower cavities is generally difficult; and as the resins remain tacky short of the completely cured state, any attempt to increase the output of a mold by heating the resin to just past the gelled state, removing the only partially cured articles, and completing the curing outside the mold, is out of the question.

It is the general object of the present invention to provide an improved method and apparatus for molding liquid or liquefiable addition type resins in a simplified and economical manner.

More specifically, it is an object of the invention to provide a molding process and apparatus whereby the removal of the molded article or articles from the cavity or cavities of the mold is facilitated.

A further object of the invention is to provide a molding process and apparatus wherein a large number of articles can be simultaneously molded in a multi-cavity mold without the necessity for measuring out separately the quantity of resin for each individual cavity.

It is a still further object of the invention to provide an improved molding process and apparatus wherein the trapping of air bubbles in the molded articles is substantially completely eliminated.

Another object of the invention is to provide a molding process and apparatus in which a mass of liquid or semi-liquid thermosetting resinous composition can be charged in bulk with but a single measurement into a multi-cavity mold to produce a multiplicity of articles with a minimum of flash or other waste.

Still another object of the invention is to provide a process for molding addition type resins wherein the incompletely cured article or articles can be removed from the mold even though it is still in a more or less tacky and fragile condition and the curing completed outside the mold.

Other objects and advantages of the invention will appear from the detailed description thereof hereinafter.

Briefly described, the present invention provides a process for the molding of liquid, semi-liquid or liquefied addition-type resins (which will hereinafter be referred to collectively as "liquid resins" or "substantially liquid resins") in the following manner:

(1) A stretchable film is laid over the bottom part of a single or multiple cavity mold, the unstretched film being of sufficient area to extend a short distance beyond the molding area on all sides thereof.

(2) The liquid resin is then placed upon the stretchable film, the quantity of resin being sufficient to fill all the mold cavities with a slight excess for flash. This involves only a single measurement or weighing, regardless of the number of cavities, which can be several hundred in number.

(3) A second film of substantially the same size as the first film is then placed over the mass of resin, so that the resin is sandwiched between the two films.

(4) The parts of the mold, which is heated, are now closed. The mold is provided with a spring-pressed retainer ring which acts to clamp the two films together at their peripheries, so as to resist the escape of resin while permitting the escape of air from between the two films.

(5) After a sufficient time has elapsed for partially or completely curing the resin, the mold is opened and the two films with the molded articles between them are removed from the mold. As will be obvious, the films themselves effect the removal of the articles from the mold cavities and the latter are left clean and free of resin residues.

(6) If the molded articles have been only partially cured, they are now subjected to further heat treatment in order to effect complete cure. This can be done either by placing the films with the articles between them in an oven heated to a suitable temperature, or by placing them in hot or boiling or even superheated water (under pressure). When the films are made of polyvinyl alcohol as described more fully hereinbelow, the water treatment will at the same time dissolve the film and thus effect separation of the articles from the films.

It is not necessary that the films and resin mass be assembled in the mold. This can be done on a separate table and the resin can, if desired, be rolled out between the films into a more or less uniform layer before the sandwich is placed in the mold.

The invention will now be further described in connection with the accompanying drawings which illustrate by way of example suitable molding apparatus for carrying out our process. In said drawings, Fig. 1 is a central vertical section through a molding apparatus constructed in accordance with the principles of our invention; Fig. 2 is a bottom plan view of the floater plate shown in Fig. 1;

Fig. 3 shows in section a simpler type of mold which has been found to be highly satisfactory in practice; while Figs. 4, 5 and 6 are fragmentary views showing details of modified forms of molds.

As the invention is of particular value for the simultaneous molding of a large number of small articles, the molds shown in the drawings are contructed for use in molding buttons, and the invention will be further described in connection with the manufacture of such articles.

Referring to Figs. 1 and 2, the top half of the mold includes a spring housing plate 50, to be described more fully hereinafter, which is disposed between and secured to a heating plate 51, and a retainer plate 52 for receiving the molding dies or cavities 53. The latter are shown by way of example as provided with recesses or cavities shaped for the molding of shirt buttons. The heating plate 51 is hollow and is charged in a known manner with a suitable heating fluid, such as steam or heated oil, which enters at 54 and is discharged as 55. In place of steam, oil or other heated fluid, electrical heating elements can be disposed within the plate 51. As the heating means form no part of the present invention, they have not been illustrated. In order to bring the source of heat close to the retainer plate 52, the spring housing plate 50 can be centrally hollowed out as indicated at 56, and the plate 51 can be provided with a central extension which fits into the cavity 56.

The plates 50, 51 and 52 are shown as square in shape, but may be of any suitable configuration. Adjacent to the corners of the plate 52 there depend guide pins 58 for a purpose which will shortly be described. A "floater" plate 59 is suitably apertured to receive the guide pins 58 and is free to slide along such guide pins. The downward movement of the floater plate may be limited by means of pins 60 whose inner ends are received within vertical grooves 61 in the guide pins, such grooves terminating short of the bottom ends of the guide pins. Spaced adjacent to the periphery of the floater plate 59 are a relatively large number of rods 62 which terminate in circular bearing plates 63 for springs 64 received within bores or chambers 65 in the spring housing plate 50. The lower ends of the rod 62 are received within recesses 66 in the plate 59; however, they may be threaded into threaded recesses 66, in which case the pins 60 and grooves 61 can be dispensed with.

It will be understood that a large number of dies or "cavities" 53 are secured within the retainer plate 52. The floater plate 59 is provided with a corresponding number of bores or holes 67 registering with the dies 53 and adapted to receive the latter with a snug fit.

As will be readily understood from the foregoing, the floater plate 59 is guided in its vertical movements on the guide pins 58 and can rise to receive the dies 53 within its apertures 67 against the resistance of springs 64. As shown in Fig. 1, the dies 53 project beyond the bottom surface of the plate 52 and the thickness of the floater plate 59 is no greater than and preferably somewhat less than the height of the projecting portion of the dies, so that when the plate 59 bears directly against plate 52, land portions 68 of the dies are exposed.

The bottom half of the mold is comprised of a steam or other heating plate 69 secured to a retainer plate 70 which carries dies or cavities 71 having projecting lands 72. The dies 71 have complementary cavities and register with the dies 53. Passing through the plates 69 and 70 at the corners thereof are holes which snugly receive the guide pins 58 of the upper mold part as the lower mold part is raised against the upper mold part (or vice versa) to close the mold.

The molding operation is preferably conducted as follows:

The de-aerated liquid addition type resinous composition containing a suitable amount of catalyst and, if desired, also a filler, pigment, pearl essence, or the like, is placed between two stretchable sheets or films 74 and 75, the resinous composition being indicated as 76. Enough resin is used to fill all the mold cavities plus a small excess. In the mode of operating indicated in Fig. 1, the liquid resin is spread more or less uniformly between the two films, so that when placed in the mold, the resin reaches the edge of the outermost rows of cavities. This can be accomplished by pressing between platens of a hydraulic or air press, using a gasket or wall to limit the outward flow of resin and give the desired area and shape to the spread resin. The films are of such area that they extend a considerable distance beyond the outer cavities in each direction. The so sandwiched resin is then placed on the bottom mold part.

The mold, which is heated, is now rapidly closed, as by raising the lower mold part in known manner. The resin will first be squeezed between the lower part of the mold and the floater plate 59. This causes the resin to be squeezed into the holes 67 in the floater plate and the resin in turn forces the upper film to stretch into these holes, so that film-covered mounds of liquid resin are formed. As the mold continues to close, and as the floater plate rises relative to the retainer plate 52, more spring pressure is brought to bear on plate 59 and additional resin is forced into the holes in the floater plate and very little is left in the areas between the cavities (the area where flash is normally formed). At the same time, the top dies or cavities enter the floater plate holes from the top; the top cavities engage the top film and start to press the liquid resin with the overlying film to the shape of the top cavities and into the lower cavities, the lower film 74 being at the same time stretched and forced against the walls of the lower cavities. As there is a slight excess of resin in each hold in the floater plate, then as the press approaches the completely closed position in which plates 52 and 59 are in contact and the lands of the top and bottom cavities pinch off separate areas of the distended films, the excess resin is forced out to form a flash between the floater plate and the bottom half of the mold and about such pinched off areas. The articles are now completely formed.

The mold is opened after the resinous composition is cured or gelled and past the point of bubble formation in the polymer. The movement of the floater plate 59 relative to the dies 53, under the action of springs 64 as the mold opens, strips the upper film off such dies, and the entire heat or batch of molded buttons is removed from the mold as a unit when the press is fully open by stripping the films with the molded articles between them from the lower mold part 70. The films are torn open and the articles then collected in a suitable receptacle. If the articles have not been completely cured, they can be subjected while still disposed between the films, to a further heat treatment as already described hereinabove.

To prevent excessive flash and possible incomplete filling of the die cavities in both mold parts, the thickness of the floater plate should be such that in the closed condition of the mold, the bottom surface of the plate is spaced from the top surface of the retainer plate 70 by a distance not substantially greater than the thickness of the two films in their compressed condition. As a result, the mass of resin encounters greater resistance to flow in the horizontal direction and toward the outside of the molding area than in the vertical direction into the mold cavities. Only very shortly before the mold is closed, will the high pressure then prevailing operate to force out any excess resin, but this will occur only after the die cavities have been filled. The top dies should fit closely into the holes in the floater plate with the smallest possible clearance, so as to prevent any film and resin from being forced between the walls of the floater plate holes and the sides of the entering upper dies as the pressure increases.

We have found that if the final stage of closing of the mold is effected sufficiently rapidly, practically no resin beyond the actual excess is squeezed out beyond the molding area. However, if desired, means may be provided for preventing the lateral extrusion of resin while yet allowing escape of excess resin as the pressure approaches its maximum. This can be accomplished by means of a compressible gasket of rubber or other composition. An alternative measure for effecting sealing of the resin between the upper and lower films 74 and 75 consists of a metallic ridge or boss 77 on the floater plate which extends about the molding area and enters a groove 74 in the bottom plate 70 as the mold is closed. It will be understood that the groove is sufficiently larger than the ridge 77 to receive the top and bottom films as their marginal portions are forced into the groove by the ridge 77. To prevent cutting of the films, the edges of the ridge and groove may be rounded or the walls thereof tapered slightly, or both these measures may be utilized.

One of the problems associated with the molding of liquid resins is the elimination of air from the molding cavities as the mold is closed. Any entrapped air will form bubbles in the molded articles and render them commercially inferior or useless. When the liquid resin is poured directly into the lower cavities, not only is it essential that the resinous composition be highly mobile, but the trapping of air is extremely difficult to avoid, with the result that many of the molded articles show defects in the form of air bubbles. By the use of two plastic films in accordance with the present invention, a single measured quantity of resin, sufficient for all of the die cavities (plus a slight excess), can be placed between the two films on a flat surface away from the mold and the resin pressed between the two films to force out all air and spread the resin between the films. The completely de-aerated film-resin-film sandwich can then be placed as a unit upon the lower half of the mold and the mold then closed, as above described. By the process of the present invention, therefore, it is possible to mold as many as 441 buttons and even more with a considerably reduced amount of flash or waste and of defective products as compared with prior molding procedures.

It is, however, not necessary to spread out the resin between the upper and lower films before the closing of the mold is begun, as such spreading of the resin can be made to occur within the mold itself. Thus, the lower film can be placed upon the lower mold parts so as to cover all of the mold cavities therein and the measured amount of resinous composition placed upon the film. The top film is then placed over the resin and the closing movement of the mold so controlled that spreading of the resin between the films is effected before any considerable pressure is created within the mold. While this procedure can be conducted with the type of mold shown in Figs. 1 and 2, we prefer to carry out this procedure with a mold of the type shown in Fig. 3. In this figure, parts corresponding to those of the construction of Figs. 1 and 2 have been similarly numbered. The mold consists again of two parts, indicated by the numerals 80 and 81, the upper mold part including a die retainer plate 52 in which are embedded a large number of dies 53, of which only one is illustrated. The heating plate 51 is heated in any suitable manner, and between such plate and the plate 52 there are disposed the spring housing plate 50 and a guide plate 82. Surrounding the dies 53 is a continuous ring 83 which, in the case of a square mold, is itself more or less of square shape. The ring 83 slides in a recess 84 disposed either between the plates 50 and 52, or within one of them. A relatively large number of bores or chambers 65 are provided in the plate 50 and are distributed uniformly along the ring 83. These chambers house compression springs 64, each of which bears upon a plate 63 of circular shape which is free to slide vertically within the chambers. A guide rod 85 is connected to each of the plates 63, and at their upper ends are received within guide bores 86 in plate 82. The lower ends of the rods extend below the plates 63 and are secured in any suitable manner to the ring 83. It will be evident that the ring 83 can rise only against the resistance of the springs 64.

The lower mold part includes the die retainer plate 70 in which are embedded the complementary dies 71 (of which only one is shown) registering with the upper dies 53. A heating plate is shown diagrammatically at 69. Secured to and extending from the plate 70 approximately at the corners thereof are guide pins 58 which are adapted to be received within guide bores 73 and in the plate 50.

In carrying out the process with the apparatus of Fig. 3, the stretchable film 74 is placed upon the bottom mold part 81 so that it overlies all of the dies 71 and extends beyond the ring 83. There is then placed on the film 74 a measured amount of resinous composition 76 sufficient to fill all of the cavities with a slight excess. A stretchable film 75 is then placed over the mass of resin, the film 75 being approximately coextensive with the film 74. The film 75 can, if desired, be smoothed by hand over the mass of resin or pressed with a roller to expel any trapped air. The bottom mold part 81 is now raised in the manner hereinbefore described, to effect distribution of the resin and gelling or curing of the molded articles. Should the resinous composition be too stiff for ready flow, the initial movement of the mold bottom 81 can be slowed or can even be interrupted as soon as the film 75 touches the retainer plate 52 to allow the resin to be heated sufficiently to insure adequate fluidity.

As will be readily understood, as the mass of resin becomes compressed against the plate 52, the retainer ring 83 will engage the outer margin of the top film 75 and act to seal the two films to each other. However, as the mold part 81 continues to rise and the pressure on the mass of resin increases, any trapped air and excess resin will be forced outwardly between the two films and against the resistance of the springs bearing on the ring 83. The ring 83 normally projects below the surface of the plate 52 to an extent such that it engages the top film 75 before any considerable pressure is applied against the mass of resin, so that the retaining or sealing ring 83 becomes effective before the resin begins to spread between the films. We prefer to give the springs 64 a pre-set pressure of about 200 lbs. each to insure an effective seal as soon as the ring is lifted by the mold part 81.

As with the mold shown in Figs. 1 and 2, the partially or completely cured articles are easily ejected from the cavities with the aid of the plastic films. As already indicated, the incompletely cured article can be further cured in an oven, or hot water, or also in any type of heated liquid, such as mineral oil, which does not dissolve the plastic film, or, where it does dissolve such film, has no solvent or chemical action on the cured resinous composition.

The pressure exerted by the mold press should be sufficient to force the resin into the cavities within the time allowed by the molding cycle. This pressure can amount to 190 or more tons for a 20 inch by 20 inch molding area (950 or more lbs./sq. in.); however, the pressure may be as low as about 75 lbs./sq. in. This pressure should of course be considerably greater than the pressure exerted by the springs 64. For a molding area of the size above specified, about 21 springs can be employed each exerting about 600 lbs. pressure in the closed condition of the mold.

With a mold of the type illustrated in Fig. 3, the cycle time from the moment that the mold begins to close is about 75 seconds for complete cure of articles of the approximate size of buttons and made with a polyester resin. About 10 seconds are allowed for the closing of the mold. As already indicated, the cycle period can be made even smaller by curing the articles only incompletely in the mold.

The lands of the dies may be either flush with the surface of the retainer plates or may extend a short distance beyond the same. The use of projecting lands has the advantage that as the mold closes, the mass of resin in each pair of complementary cavities is pinched off from any surrounding flash. This is illustrated in the enlarged view in Fig. 4, wherein the lands 68 and 72 of the dies 53 and 71, respectively, have pinched between them the films 75 and 74 which have been forced into the cavities of the dies and enclose the shaped mass of resin 76 within the cavities. The height of the lands 68 and 72 is approximately equal to the thickness of the films in the unstretched or uncompressed condition, with the result that in the areas surrounding the lands, i.e., in the regions between the dies, only a very thin flash will be formed, as indicated at 88, but such flash will be cut off from the mass of resin 76. The lands are shown chamfered at 87.

Our invention contemplates the molding of various kinds of objects, including articles having substantial thickness or of relatively complex form, such as shank buttons and objects of even more irregular form. Accordingly, the films 74 and 75 must be capable of considerable stretch or elongation without rupture as they are drawn or pulled into the mold cavity by the flowing resin and line the walls of the cavities. For some purposes a film capable of stretching to the extent of only about 100% in all directions will be found satisfactory; however, for thicker objects or more complicated shapes, a stretch of 400 to 600% or even higher is preferred.

We have found polyvinyl alcohol films to be particularly well suited for use in our process, as they are strong, have a high stretchability and are heat-resistant. Polyvinyl alcohol films can withstand the temperature employed in our process and are characterized by an elongation of 400 to 600% and even more, so that quite complicated objects can be molded with the aid of such films. Films of cellulose acetates, cellulose acetate-butyrate, and cellulose triacetate have sufficient stretch to be used for the manufacture of various articles according to our process, and this applies to cellulose esters generally.

Tests have shown that cellophane is not suited for use in the molding of articles having any considerable depth, as it does not have sufficient elongation before rupture sets in. It can, however, be used where the cavity is entirely in one mold part, the other mold part presenting a substantially flat surface, and against such flat surface the cellophane sheet can be employed. With such cellophane sheet there would then have to be employed a film capable of being stretched to the extent of at least about 100%, such as a film of polyvinyl alcohol, which would be placed against the mold part carrying the cavities, or the deeper cavities.

For small shank buttons, the polyvinyl alcohol film can have a thickness of 0.0015 to 0.003 inch. For flat shirt buttons, this thickness can range from 0.001 to 0.002 inch. In general, for objects requiring a deeper draw of the films, the greater thicknesses of film will be used.

As already indicated, the molding compositions employed in our process comprise liquid or semi-liquid thermosetting resins of the addition type, i.e., polymerizable resins or mixtures of resinous condensates and monomers which do not liberate water of condensation or other vapors or gases on gelling or polymerizing. Suitable addition type thermosetting resins are the known polyester and epoxy resins, various formulations of which are commercially available. We have obtained very satisfactory results with "Laminac" 4120 and 4134 manufactured by American Cyanamid Co. The first of these resins yields a rigid product, while the second produces flexible articles. Mixtures of these compositions may be employed, such as a mixture of 85% to 97% of Laminac 4120 and 15% to 3% of Laminac 4134. Another commercially available group of resins which can be employed are those sold under the trademark "Selectron" by Pittsburgh Plate Glass Co., of which No. 5027 yields relatively rigid, while No. 5124 yields relatively flexile products. As in the case of the Laminac resins, mixtures of Selectron resins may be employed, and likewise mixtures of Laminac and Selectron resins, depending upon the combination of properties desired in the molded articles. Especially after the addition thereto of fillers or pigments, the resinous compositions may be pasty in form at room temperature. Among the epoxy types of resins that can be used are those sold by Ciba under the trademark "Araldite," and by Shell Chemical Co. under the trademark "Epon." When the catalyzed resins have a short "pot life," the catalyst is added shortly before molding.

Where the resins are quite solid at room temperature, such as certain epoxy resins, they can be fused by heating to a temperature short of gelling, after which the catalyst or catalysts of known character are mixed therewith and the mixture then placed on a film in the heated condition immediately prior to molding.

In molding the Laminac resins, the temperature of the bottom part of the mold can be kept permanently at about 225° F., while the temperature of the top part of the mold is about 195° F. but can be considerably higher, for example 245°–260° F., depending upon the nature and quality of the catalyst and the type of resin employed. The reaction is exothermic in character, so that if larger articles are molded, the mold temperature itself can be lower. The quantity of catalyst contained in the resin will be determined by the cycle period of the molding operation which in turn will depend upon the size or thickness of the molded article.

Our invention is of particular advantage in the manufacture of buttons having a pearly or pearlescent appearance. For this purpose, there is incorporated in the resin a quantity of pearl essence, such as fish scales, or known artificial materials, like iridescent flakes. Our process causes considerable flow of the resin, so that the fish scales or other pearlescence-producing material become properly oriented to produce very pleasing pearlescent effects. Other known surface appearance modifying materials can likewise be added to the resin, such as pigments and dyes, and also various inert fillers.

The following examples of molding compositions are presented by way of illustration and are not to be construed as indicating the scope of the invention:

*Example 1*

The following composition is suitable for the molding of polyester buttons with a pearly effect which is an integral part of the molded product, the parts being by weight:

| | |
|---|---|
| Laminac 4120 | 95 |
| Laminac 4134 | 5 |
| Pearl essence | 2 |
| Luperco ATC (catalyst) | 2 |

The Laminac resins, as already stated, are polyester resins, 4120 being a rigid type, and 4134 a flexible type. Luperco ATC is a 50:50 mixture of benzoyl peroxide and tricresyl phosphate, and is used as the catalyst for the polyester resins.

The rigid resin, Laminac 4120, is mixed with the catalyst Luperco ATC in a dough type mixer. The pearl essence is mixed with the flexible resin Laminac 4134 in a turbine type mixer. In the latter case, care must be taken so as not to destroy the pearl flakes. Then the required amount of pearl essence-flexible resin mixture is added to the rigid resin-catalyst mixture in the dough type mixer and mixing continued until uniformity is attained. The resultant mixture has a viscosity of 14,000 centipoises at 75° F. and a useful pot life of more than two weeks if maintained at normal room temperatures.

The resin is then deaerated either by applying vacuum or by allowing the mixture to stand undisturbed at room temperature until all the air has risen to the surface. In either case, the time for deaeration depends upon the temperature of the mixture, the size and amount of air bubbles introduced in the mixing operation, and the height of liquid being deaerated. At a room temperature of 75° F., usually 4 hours are sufficient for vacuum deaeration, while allowing the mix to stand overnight is sufficient for natural deaeration. When applying vacuum, the reduced pressure should not go below the vapor pressure of any volatile component, such as the cross-linking monomeric styrene, at the temperature of the mix.

The deaerated resin is now measured out on a film of polyvinyl alcohol having a thickness of 0.002", a second film placed over the resin mass, and molding carried out as above described at 240° to 250° F. for 75 to 80 seconds at a pressure of 250 to 1000 lbs./sq. in.

*Example 2*

The proportions of the components of the composition can be varied to modify the properties and surface appearance of the products, an example of a modified formulation being the following, the parts being by weight:

| | |
|---|---|
| Laminac 4120 | 93 |
| Laminac 4134 | 7 |
| Natural pearl essence (fish scales) | 1 |
| Luperco ATC | 1 |

This composition will require a somewhat longer cycle period because of the smaller amount of catalyst.

*Example 3*

The following is a known composition based on an addition type epoxy resin the parts being by weight:

| | |
|---|---|
| Araldite 6010 (Ciba) | 100 |
| Araldite HN951 (Ciba) | 12 |

The Araldite HN951 is an amine type hardener (catalyst) which at 212° F. effects hardening in 10 to 30 minutes, depending on the size of the molded article, but at higher temperatures considerably shorter cycle periods are adequate.

In carrying out our process and employing a 441-cavity button mold, we employ about 200 grams of the resin composition, which includes an excess of about 10 to 20 grams for the flash. The excess can be reduced in amount but it is desirable to provide always for a certain amount of flash because of the difficulty in measuring exactly the viscous liquid or even pasty resinous composition.

Our above-described two-film procedure can be modified in various ways. Thus the two films need not necessarily be two separate sheets but may be formed by folding over a single sheet. In fact, the two films can be sealed at one, two, or three sides thereof, leaving the other side or sides open for the escape of air until they are sealed by the clamping action of the mold. The discharged excess of resin may burst the sealed edges, but this will not affect the molding operation.

Also, when the mold cavity is entirely in one of the mold parts, the face of the other mold part being then smooth and free from cavities, the film facing such other mold part need not be of highly stretchable character and may consist of cellophane and even of paper or the like. If the paper is sufficiently porous for the resin to penetrate it, this will ordinarily not be a disadvantage, as articles like buttons are turned or ground down to the finished shape. This is illustrated in Fig. 4, wherein the highly stretchable film is again indicated by the numeral 74, while the more or less non-stretchable film is shown as 74a, the molded resin being indicated as 76 in the form of a shank button.

When the cavities are all in one part of the mold, the other part presenting a continuously flat surface as in Fig. 4, certain of the advantages of the invention can be realized by the use of only a single highly stretchable film provided that the film is interposed between the resinous composition and the cavities. The second film can in such case be replaced by a brushed-on or sprayed-on coating of a separating compound or lubricant to which the resin is inert. Thus, if the cavities are all in the upper part of the mold, the measured amount of resin can be placed on the bottom mold part and the stretchable film then placed over the resin, so that as the mold closes, the film will be stretched and drawn into the cavities. On the other hand, if the cavities are all in the lower half of the mold, then the stretchable film is placed over the cavities and the resin deposited on the film, and the cavity-free top half then directly contacts the resin. In both of these variations, it is desirable that the spring pressed retaining ring 83 be disposed on that mold part which contains the cavities, so that it will be protected by the film against excess of the resin which, under the pressure of the mold, would otherwise be forced into the spring chambers 65.

To insure escape of excess resin, and thereby keep the thickness of the flash between the mold cavities at a minimum, small grooves or orifices can be cut in the retaining 77 or 83 through which the excess resin can escape, should the resistance exerted by the ring become too great. However, by this time, the mold cavities will all have been filled with resin encased in the stretched film. The retainer ring can be replaced by a rubber or other compressible gasket which can be similarly provided with escape ports for the excess resin at the maximum pressures of the mold. The springs acting on the retaining ring can be replaced by pneumatic or hydraulic pressure.

The sandwiching of the resin between the upper and lower films has the further advantage that the resin-film composite can be suspended over the mold area and between the upper and lower parts of the mold until the mold begins to close. In this way, the opposite sides of the mass of resin are heated uniformly by the two halves of the mold and local overheating and uneven curing are avoided. Thereby a better control of uniformity and also of the shrinkage of the finally cured products are obtained.

As will be understood from the foregoing, the resin is kept out of contact with the mold parts by the pliable and plastic films. The mold itself as well as the dies can therefore be made of any suitable material without consideration of any effect of the metal on the resin and vice versa. As the resin never touches the mold parts, the operation is a very clean one, and the mold is ready for the next cycle as soon as the films with the molded articles between them are removed.

The plastic film-resin composite can also be pre-heated to any desired condition outside the press, and thereby be readied for molding. Such pre-heating imparts better formability and aids in proper orientation of such additions as pearl essence particles, owing to the fact that the viscosity is reduced by the heating. In addition, the press cycle period can be reduced, and the output of the molding press is thereby increased. Also, as already indicated, the resin can be spread out uniformly between the upper and lower films, so as to extend over an area corresponding to the molding area prior to the actual molding operation and outside the mold itself. This provides uniform distribution of the resinous material and results in a minimum of flow which is desirable in certain cases, as in the molding of articles having an integral sheen, wherein minimum flow is necessary to obtain certain desired effects. If the resinous composition contains fillers or pigments which do not flow as readily as the resin, the uniform spreading of the resin prior to molding will insure more uniformly molded pieces. In this spread-out condition, the resin can also be chilled or frozen both for storage purposes and for producing certain desirable effects during molding.

Our process also makes it possible to provide the whole surface of the molded article with special surface effects which are integral with the main body of the articles. Thus, the molded articles can be provided with an integral surface layer of any desired color, pattern or texture, by coating the inside surfaces of the upper and lower films with a composition which will fuse with the molding resin into an integral resinous mass. The color, design, light-reflecting properties, texture, and the like, imparted by the coatings on the two films may be harmonious or contrasting. The inside surfaces of the films can be provided with the desired coating by spraying, brushing, stencilling or in any other suitable manner. The coatings can contain a resin of the same character as the molding composition, or it may be of a different type of resin which is miscible or compatible with the molding resin. The resinous coating can be gelled or conditioned in any suitable way on the films before the molding resin is placed between such films. Special effect coatings can also be applied by reverse roll coating devices, and also can be applied in the form of a solution, after which the solvent is evaporated and the resinous coating heated until the desired consistency is obtained, which should, however, preferably be short of the final insoluble, infusible condition.

If the coatings on the films are gelled prior to the molding operation, this will prevent any substantial flow of the special effect resin into the mass of molding resin. On the other hand, if some degree of mixing is desired to give a more random effect, the special effect resin can be air-dried until its surface has lost most of its tack. If maximum blending is desired, the special effect resin can be molded with the molding resin as soon as it is prepared. The gelling of the special effect resin can be accomplished either by heat or by the use of a cold-setting catalyst, or by a combination of both. The special effect resins can be transparent, translucent or opaque and with or without internal sheen and with or without iridescent or pearlescent flakes. Mottled effects can be produced by using a plurality of colors. Polyvinyl alcohol films are especially well adapted for this purpose, because they are hydrophilic in nature and the resinous coating therefore separates readily from the films.

While we have described our invention as applied to the manufacture of buttons, it will be evident that our process is of wide application for the molding of a great variety of articles and of different sizes, such as knife handles, parts for toys and games, articles of jewelry and other ornamental objects, boxes, casings for various types of instruments, etc. Button and other blanks may likewise be molded by our process which can then be machined to their final shapes.

We claim:

1. Process for molding articles with substantially liquid addition type resins which comprises placing a flat film of polyvinyl alcohol having a degree of stretchability of over 100% before rupture upon the bottom part of a two-part mold, the parts of the mold being movable relative to each other, said bottom part containing a plurality of mold cavities therein, depositing upon the film a quantity of liquid addition type resin sufficient to fill all of the mold cavities, providing the face of the other mold part with a parting means for the resin, moving the mold parts toward each other to cause the mass of resin to spread over the area of the mold while allowing air to escape at the sides of the mold, continuing the closing movement of the mold parts to place the resin under pressure and cause it to expand the film into the cavities to line the walls thereof, substantially simultaneously yieldingly clamping the peripheral region of the film and parting means as the mold parts approach their closed position, to resist the escape of resin, closing the mold, and subjecting the shaped resin to heat to cause setting thereof.

2. In a process for simultaneously compression-molding a plurality of articles in a heated common mold having upper and lower parts movable relative to each other, the steps which comprise providing the mold with upper and lower films having disposed between them a quantity of a thermosetting substantially liquid addition type resin sufficient for all of the cavities of the mold, moving the mold parts relative to each other toward closed position, the mold cavities being disposed in at least one of the mold parts, and the film which directly covers a mold part having mold cavities being made of a material capable of being stretched by at least 100% under the pressure of the compressed resin so as to expand into and snugly line the mold cavities without rupture, as the mold parts approach the closed position, yieldingly clamping the peripheral region of the films so as to resist the escape of resin outside of the molding area while allowing air to escape, and closing the mold under pressure and holding the same closed until the resin has set.

3. In a process for simultaneously compression-molding a plurality of articles in a heated common mold having upper and lower parts movable relative to each other, the steps which comprise providing the mold with upper and lower films having disposed between them a quantity of a thermosetting substantially liquid addition type resin sufficient for all of the cavities of the mold, moving the mold parts relative to each other toward closed position and placing the resin under pressure, clamping the peripheral region of the films so as to resist the escape of resin outside of the molding area while allowing air to escape, the mold cavities being disposed in at least one of the mold parts, and the film which directly covers a mold part having mold cavities being made of a material capable of being stretched by at least 100% under the pressure of the compressed resin so as to expand into and snugly line the mold cavities without rupture, as the mold parts approach the closed position, and closing the mold under pressure and holding the same closed until the resin has set.

4. Process according to claim 2, wherein the film which directly covers a mold part having cavities therein is composed of polyvinyl alcohol.

5. Process according to claim 2, including the step of de-aerating the space between the films prior to the application of heat and pressure.

6. Process according to claim 2, wherein the resin composition comprises a thermosetting polyester resin.

7. Process according to claim 2, including the step of distributing the resin substantially uniformly over an area of the lower film co-extensive with the cavities of a multi-cavity mold.

8. Process according to claim 7, wherein a single measured quantity of resin which is slightly in excess of the amount necessary to fill all the cavities of the multi-cavity mold is placed on the lower film.

9. Process for simultaneously molding a plurality of articles, which comprises placing between two flat pliable films an amount of a thermosetting liquid resinous composition sufficient to fill the cavities of a multi-cavity mold, at least one of the films being made of plastic material and capable of being stretched to the extent of at least 200% without rupture, and both of said films being inert to the resinous composition, spreading the resinous composition between the films while allowing air to escape at the sides of the films, compressing the composition between the two parts of a multi-cavity mold while pinching the periphery of the films to oppose escape of resinous material as the mold is closed and thereby causing the resinous material to force the films into the mold cavities to line the walls thereof, subjecting the resinous material to elevated temperature, thereafter opening the mold, and removing the films with the molded articles.

10. Process for molding articles, which comprises depositing upon a flat polyvinyl alcohol film a quantity of a substantially liquid resin composition which is non-reactive toward the film and is slightly in excess of the amount required to fill the cavities of a multi-cavity mold, placing a second film over the resin composition, subjecting the mass of resin with said films to heat and pressure between the lower and upper parts of a multi-cavity mold while yieldingly clamping the films along their peripheries to resist the escape of resin, polyvinyl alcohol film having a degree of stretchability such that it is expanded by the compressed resin into the mold cavities and snugly line the same without rupture, whereby the resin composition forces the film material to enter and press tightly against and line the walls of the cavities, subjecting the resin to elevated temperatures to cause setting of the resin, and thereafter opening the mold and removing therefrom the films and molded articles.

References Cited in the file of this patent

UNITED STATES PATENTS

| | | |
|---|---|---|
| 1,072,915 | Cook et al. | Sept. 9, 1913 |
| 1,596,739 | Kinsley | Aug. 17, 1926 |
| 2,370,572 | Muskat et al. | Feb. 27, 1945 |
| 2,513,785 | Browne | July 4, 1950 |
| 2,613,397 | Borkland | Oct. 14, 1952 |
| 2,652,597 | Sucher | Sept. 22, 1953 |
| 2,673,371 | Uhlig | Mar. 30, 1954 |